(12) United States Patent
Arnaud et al.

(10) Patent No.: US 12,524,248 B2
(45) Date of Patent: Jan. 13, 2026

(54) APPLICATION CONFIGURATOR USING A BASELINE MODEL

(71) Applicant: Anaplan, Inc., San Francisco, CA (US)

(72) Inventors: Guillaume Arnaud, Palo Alto, CA (US); Francesca Brooke Wolf, San Francisco, CA (US)

(73) Assignee: Anaplan, Inc., San Francisco, CA (US)

( * ) Notice: Subject to any disclaimer, the term of this patent is extended or adjusted under 35 U.S.C. 154(b) by 177 days.

(21) Appl. No.: 18/427,311

(22) Filed: Jan. 30, 2024

(65) Prior Publication Data

US 2025/0245022 A1 Jul. 31, 2025

(51) Int. Cl.
*G06F 9/445* (2018.01)
*G06F 9/451* (2018.01)
*G06F 9/54* (2006.01)

(52) U.S. Cl.
CPC .......... *G06F 9/44505* (2013.01); *G06F 9/453* (2018.02); *G06F 9/541* (2013.01)

(58) Field of Classification Search
CPC ....... G06F 9/44505; G06F 9/453; G06F 9/541
USPC .......................................................... 713/1
See application file for complete search history.

(56) References Cited

U.S. PATENT DOCUMENTS

| | | | | |
|---|---|---|---|---|
| 5,323,393 | A * | 6/1994 | Barrett | H04L 69/24 340/4.32 |
| 5,666,501 | A * | 9/1997 | Jones | G06F 8/61 715/835 |
| 5,694,537 | A * | 12/1997 | Montenegro | G06F 11/1443 710/45 |
| 6,080,207 | A * | 6/2000 | Kroening | G06F 8/63 717/172 |
| 6,775,829 | B1 * | 8/2004 | Kroening | G06F 8/63 717/121 |
| 8,984,101 | B1 * | 3/2015 | Viswanath | H04L 67/1008 709/223 |
| 10,404,833 | B1 * | 9/2019 | de Sales, Jr. | G06F 9/44505 |
| 2002/0001307 | A1 * | 1/2002 | Nguyen | H04J 3/0685 370/386 |
| 2002/0095595 | A1 * | 7/2002 | Christopherson | H04L 69/329 726/4 |
| 2004/0030740 | A1 * | 2/2004 | Stelting | H04L 67/10 709/201 |
| 2004/0177194 | A1 * | 9/2004 | Benson | G06F 13/387 710/300 |
| 2004/0240097 | A1 * | 12/2004 | Evans | G11B 15/689 |
| 2005/0124332 | A1 * | 6/2005 | Clark | G06F 8/65 455/418 |

(Continued)

*Primary Examiner* — Paul R. Myers
(74) *Attorney, Agent, or Firm* — Chamberlain, Hrdlicka, White, Williams & Aughtry

(57) ABSTRACT

A system for managing data includes an application configurator that is configured to obtain, from the client device, a request for a new generated application, wherein the set of configured models is based on a baseline model. In response to the request, the application configurator initiates a guided setup using an user interface to obtain a set of configuration selections for generating the set of configured models, generates the set of configured models based on the set of configuration selections, and apply a set of application programming interface (API) calls to the baseline model to generate a data hub and a spoke model. The data hub and spoke model is provided to a client device requesting the set of configured models.

20 Claims, 17 Drawing Sheets

(56) References Cited

U.S. PATENT DOCUMENTS

| | | | |
|---|---|---|---|
| 2008/0082517 A1* | 4/2008 | Sattler | G06Q 10/06 707/999.005 |
| 2008/0183532 A1* | 7/2008 | Barnard | G06Q 10/1093 705/7.17 |
| 2010/0145671 A1* | 6/2010 | Allstrom | G06F 9/44505 703/21 |
| 2014/0297713 A1* | 10/2014 | Meigen | G06F 8/20 709/203 |
| 2018/0239787 A1* | 8/2018 | Viol | G06F 16/217 |
| 2018/0364674 A1* | 12/2018 | Kapila | G05B 19/00 |
| 2021/0184936 A1* | 6/2021 | Mutnuru | H04L 45/04 |
| 2022/0027170 A1* | 1/2022 | Gulick, Jr. | H04W 4/029 |
| 2023/0136814 A1* | 5/2023 | Kim | G06F 3/1431 345/204 |
| 2025/0173340 A1* | 5/2025 | Yu | G06F 21/602 |

* cited by examiner

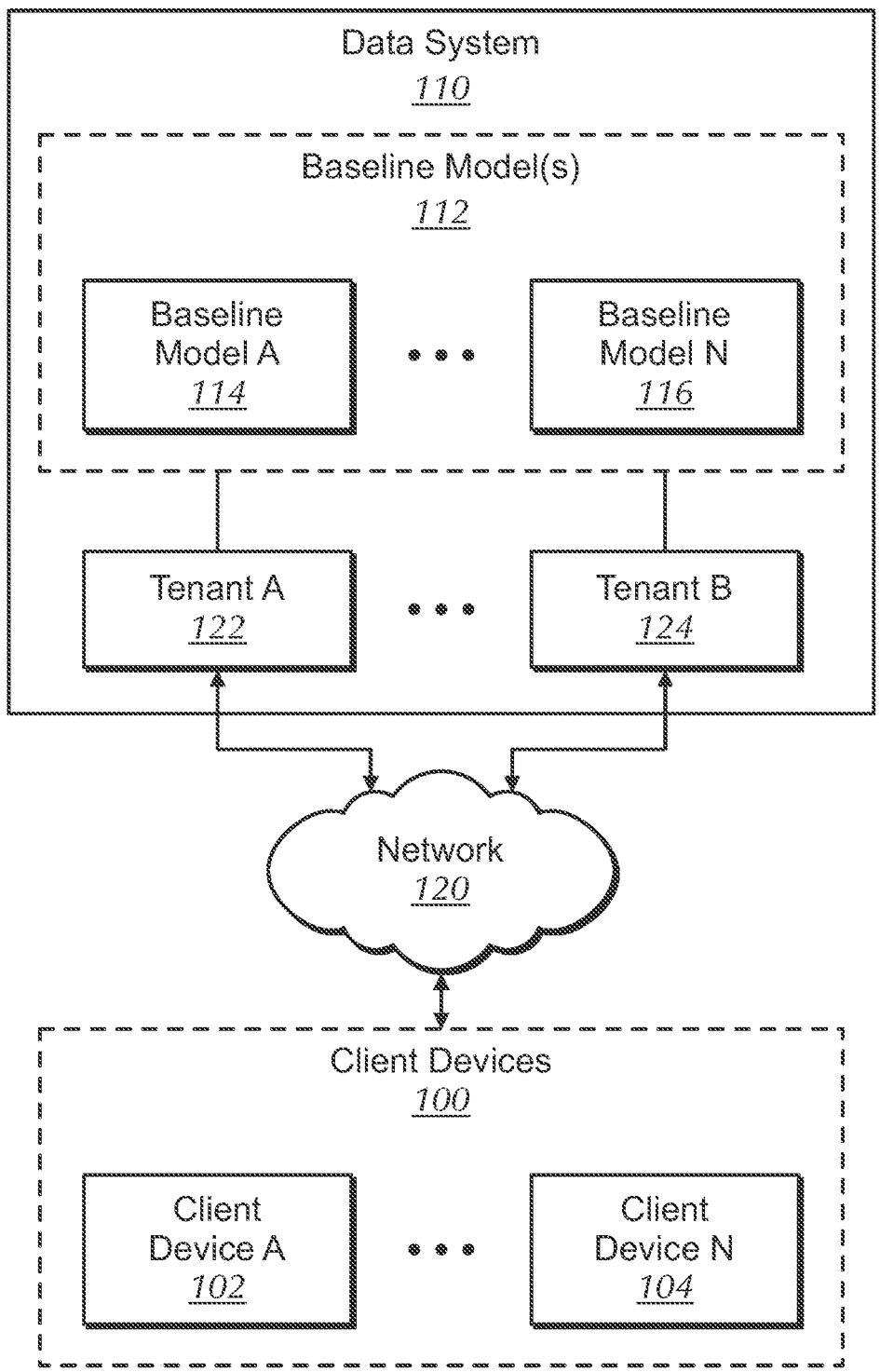
FIG. 1.1

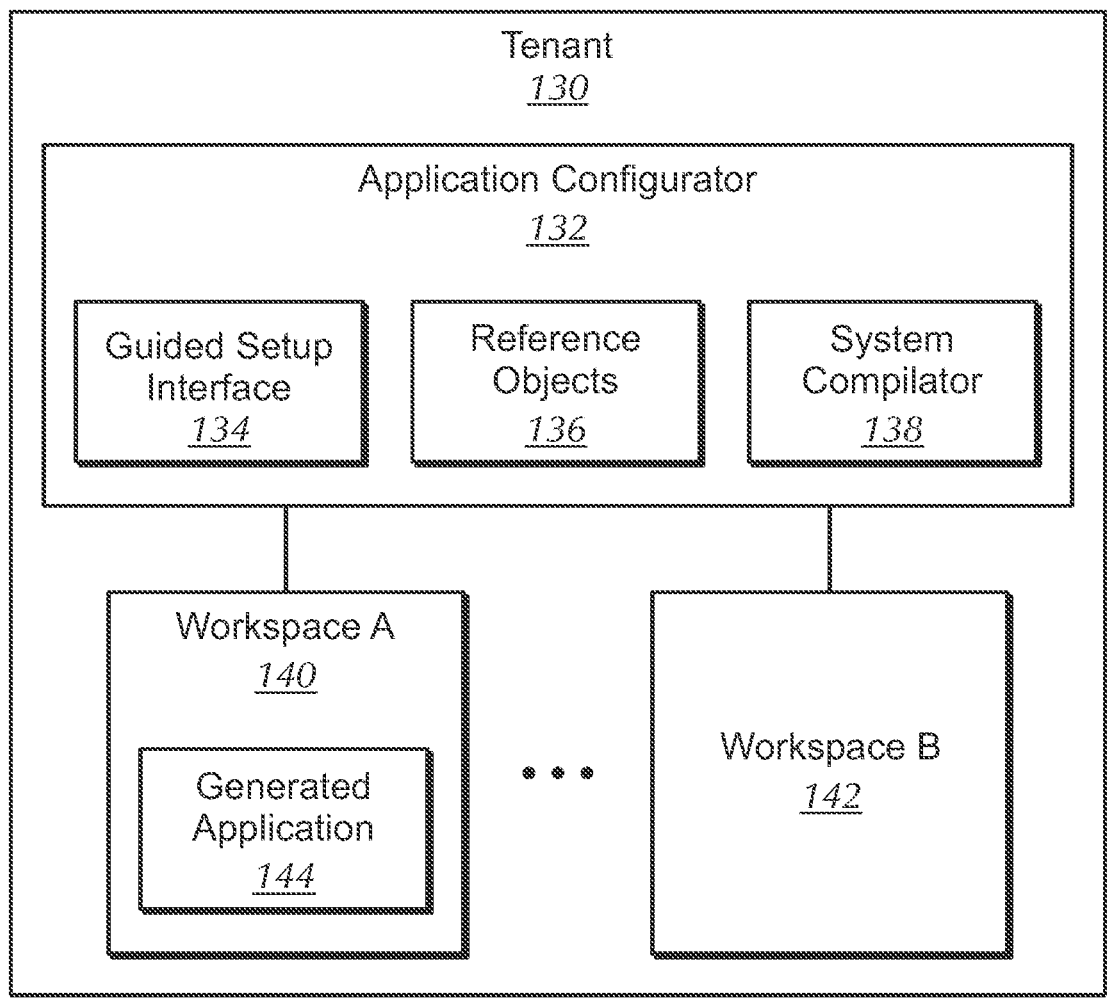
FIG. 1.2

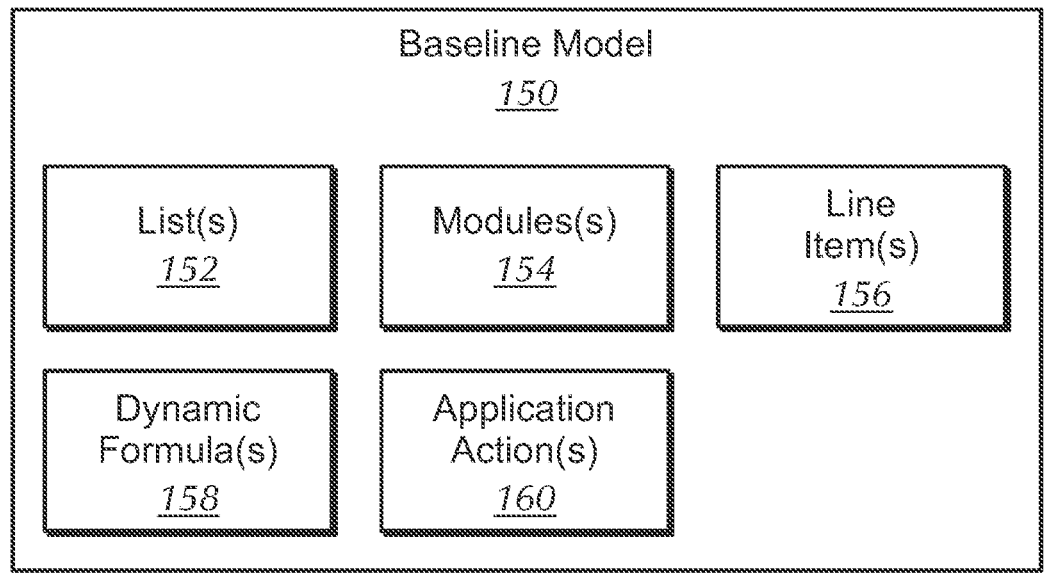
FIG. 1.3
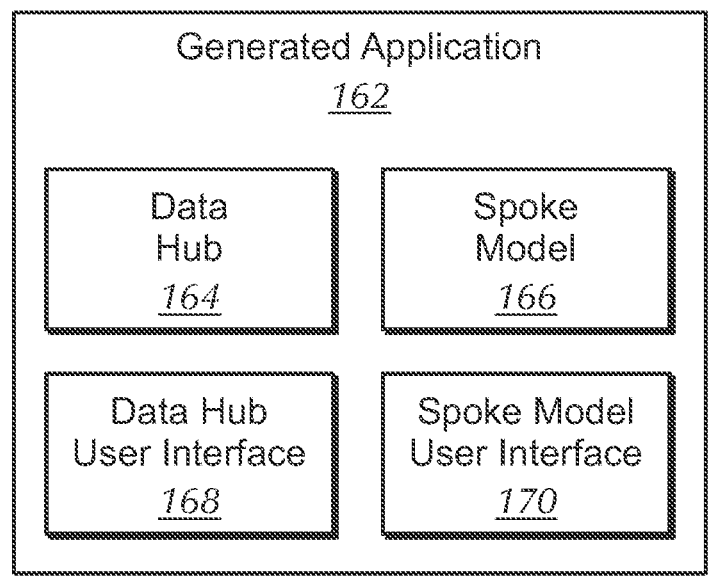
FIG. 1.4

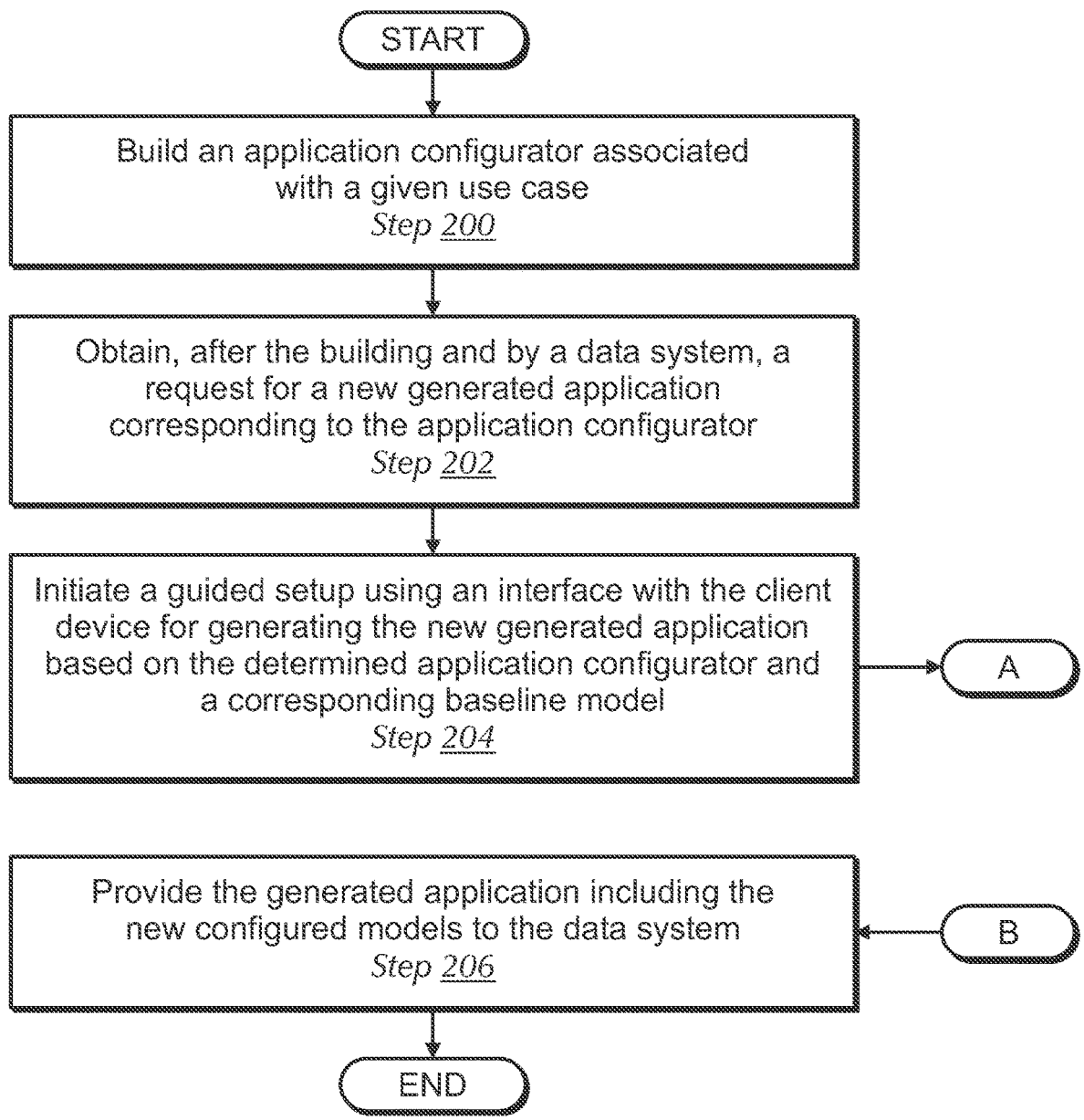
FIG. 2.1

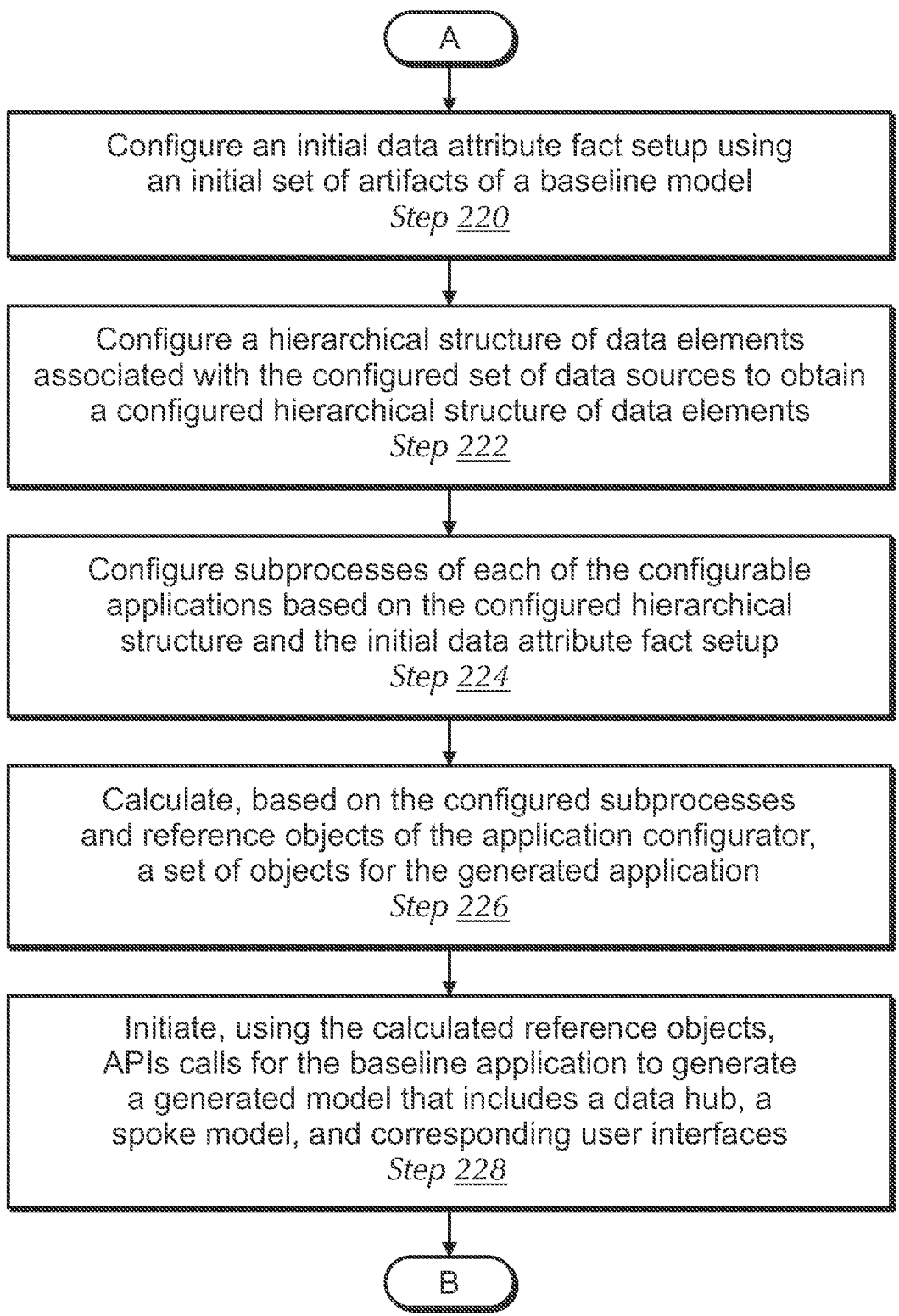
FIG. 2.2

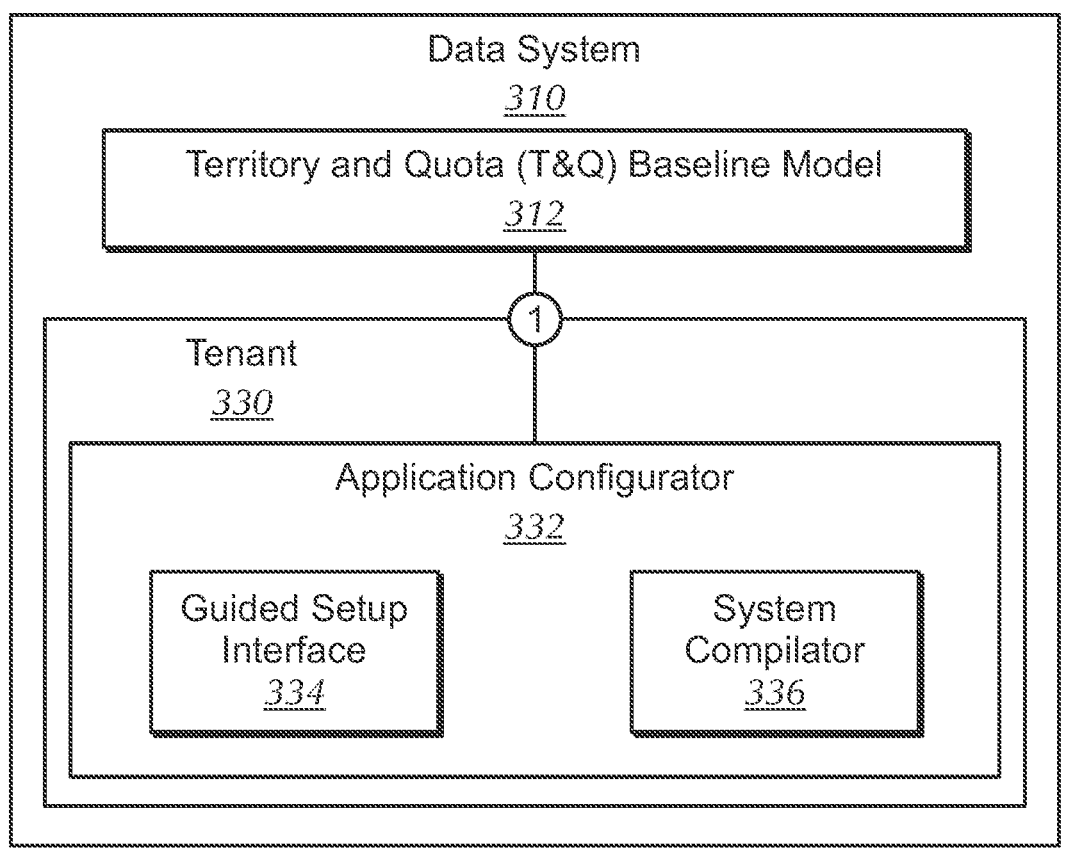
FIG. 3.1

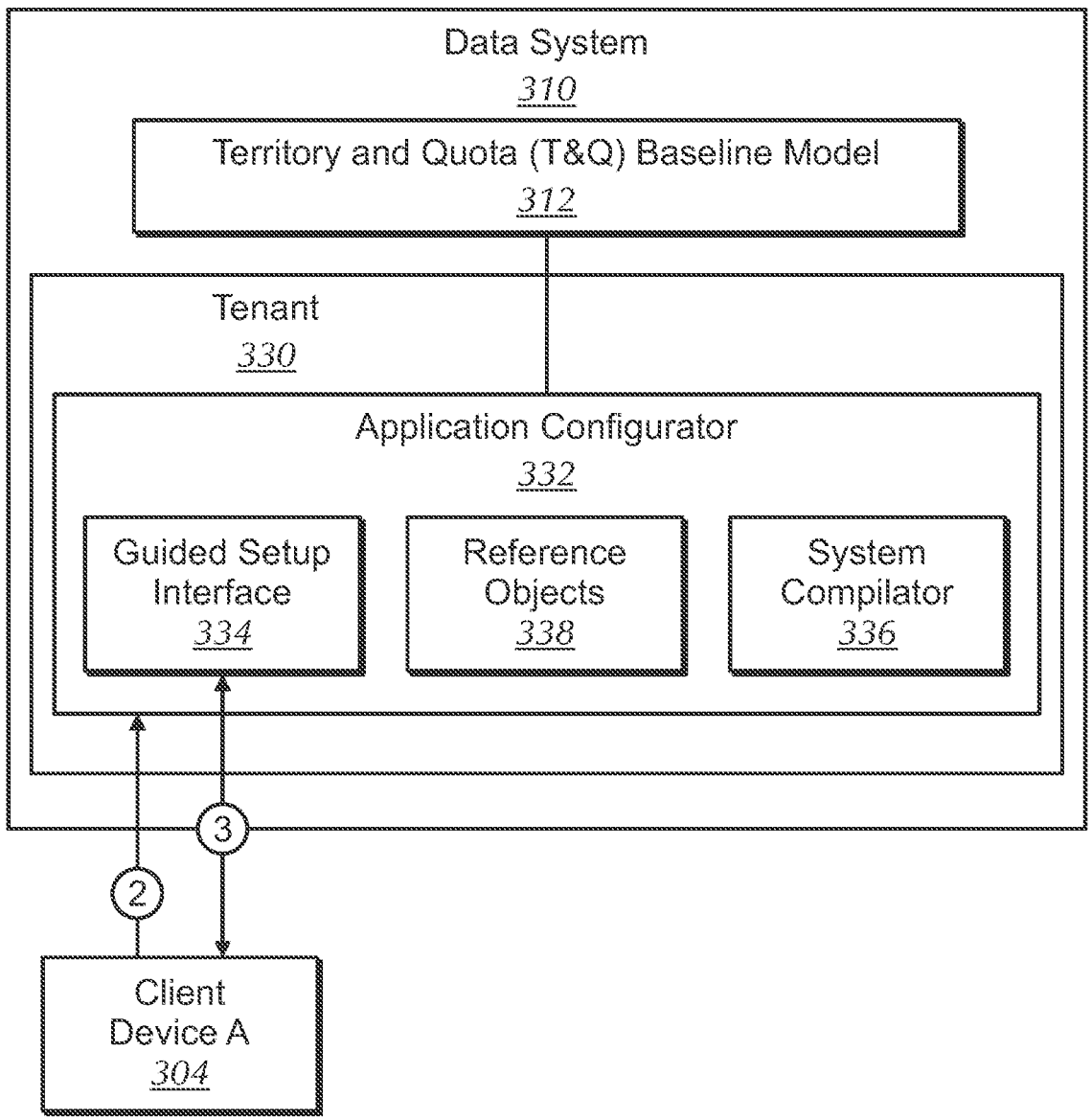
FIG. 3.2

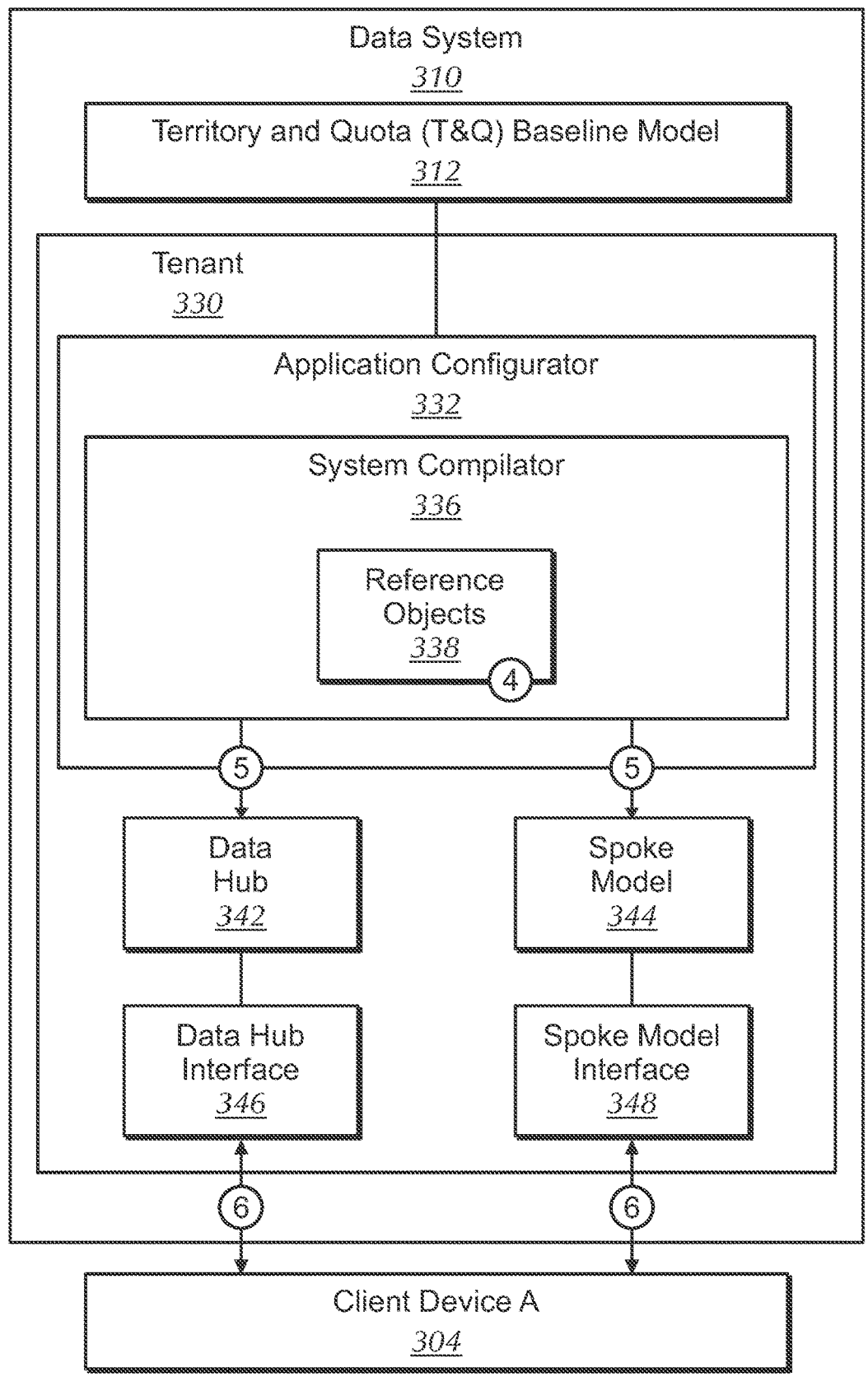
FIG. 3.3

Configure and setup your data hub and spoke model with the transactions (facts) and hierarchies (dimensions) used in your T&Q planning application Next: Set up you hierarchies >

Data required to complete this step:

You may find it very useful to have examples of your data to reference for each of the planning process as you define your data hub and spoke model objects and attributes.

Your Anaplan COE lead or partner can also provide help with completing this step.

☑ Completed
Data Hub and Model Setup

Step 1: Select the use case

Choose Use Case

Territory and Quota, and Sales Capacity Planning

Step 2 (Optional): Rename existing dimensions

Optional: Rename existing objects. For example, change Product to Products.

Add additional objects. While adding, select the object type. For example if adding the customer dimension, you would select "Hierarchy", if adding transactional object, e.g., invoices, you'd select "Data".

Dimension and Fact Setup — 404

80% Complete — 406

| 402 | Include? | Rename | Type | Delete | Inherit Attributes From |
|---|---|---|---|---|---|
| Quotes | ☐ | | Data | ☐ | |
| Quote Details | ☑ | | Data | ☐ | |
| Orders | ☑ | | Data | ☐ | Account |
| Order Details | ☐ | | Data | ☐ | Account |
| Invoices | ☑ | | Data | ☐ | |
| Invoice Details | ☑ | | Data | ☐ | |
| Quota | ☑ | | Data | ☐ | |
| Opportunities | ☑ | | Data | ☐ | Account |
| Opportunity Lines | ☑ | | Data | ☐ | Account |
| Account | ☑ | | Hierarchy | ☐ | |
| Product | ☑ | | Hierarchy | ☐ | |
| Sales Rep | ☑ | | Hierarchy | ☐ | |
| Territory | ☑ | | Hierarchy | ☐ | |
| NAICS Industry | ☑ | | Hierarchy | ☐ | |
| Industry | ☑ | | Hierarchy | ☐ | |

| Reference Functional Area | | Is Reference List (Manual) | Hierarchy | Add Subset | Enable Mandatory Input Check? | For User Data Entry | Enable Mandatory Attribute Li... | Enable Mandatory Link List | By Multi Level | By Multi Lists | By Multi List, Mandatory Time... | By Measures | By All Lists |
|---|---|---|---|---|---|---|---|---|---|---|---|---|---|
| Territory Level for County Map | Territory Assignment | ☑ | Territory H... | | | | | | | | | | |
| Territory Level for State Map | Territory Assignment | ☑ | Territory H... | | | | | | | | | | |
| Territory Levels | Quota Setting | ☑ | | | | | | | | | | | |
| Territory Levels for Approvals | Resource Assignment | | Territory H... | | | ☑ | | | ☑ | | | | |
| Territory Levels for Approvals - Sales... | Resource Assignment | | Territory H... | | ☑ | ☑ | | | ☑ | | | ☑ | |
| Territory List | Data Hub Modules | ☑ | Territory H... | | | | | | | | | ☑ | |
| Territory Name Identifier | | ☑ | Territory H... | | | | | | | | | ☑ | |
| Territory Parent Identifier | Scenario Planning | | Territory H... | | | | | | | | | | |
| Territory Target Import Level | Resource Assignment | | Territory H... | | | ☑ | | | | | | | |

FIG. 6.2

| Reference Functional Area | | Is Reference List (Manual) | Hierarchy | Add Subset | Enable Mandatory Input Check? | For User Data Entry | Enable Mandatory Attribute Li... | Enable Mandatory Link List | By Multi Level | By Multi Lists | By Multi List, Mandatory Time... | By Measures | By All Lists |
|---|---|---|---|---|---|---|---|---|---|---|---|---|---|
| Target Imports | Target Setting and Allocation | | Territory H... | | ☑ | | | | | | | | |
| Target Overallocation Adjustments | Target Setting and Allocation | | Territory H... | | | ☑ | | | ☑ | ☑ | | | |
| Target Override Level | Target Setting and Allocation | ☑ | | | ☑ | | | | | | | | |
| TEH Attributes | Resource Assignment | | | | | | | | | | | | |

< 1.06. Target and Allocation 1 [MODEL OFFLINE] ↻ ⌄ ☆ sales hierarchy, at the product family of product SKU level? is a different measure used to define targets?

Step 1: Configure dimensions

1a. Select territory level
Select the level for territory target during import.

| | Select a Level | Level Name |
|---|---|---|
| Territory Target Import Level | Level 2 | Area T2 |

1b. Select additional dimensions
If required add in an additional dimension to use for target planning. For example, select product.

| 3rd Dimension | 4th Dimension |
|---|---|
| Product P2 | |
| Target Imports | |

1c. Review final dimensionality
Based on the selections above review the dimensions that will be used for target setting. (1st Dimension is defined based on the territory level selected above, 2nd Dimension will contain the planning measures, and 3rd - 5th Dimension will contain the selections above.

| 1st Dimension | 2nd Dimension | 3rd Dimension | 4th Dimension |
|---|---|---|---|
| Area T2 | Planning Measure | Product P2 | |

620 (pointing to first table)
622 (pointing to second table)

*FIG. 6.3*

| Prefix Name | Fixed Name | Display Order ↑ | Configuration | Secondary Configuration | Overdue Target Functional... | Default Configuration for Time... | Module |
|---|---|---|---|---|---|---|---|
| — TARGET SETTING AND ALLOCATION — | ☑ | 0 | | | | | |
| INPUT: Default Allocation Blend | ☑ | 2 | | | | | |
| INPUT: Allocation Blend | ☑ | 3 | | | | | |
| Target Import by Territory, Time and other | ☐ | 5 | Target Imports | | | | |
| Target Import by Territory, Time and other | ☐ | 6 | Target Imports | | | | |
| Target Allocation by Territory, Time and other | ☐ | 7 | Target Imports | | | | |

| | Set Dimensions | Exclude From Module Naming |
|---|---|---|
| 1st Dimension | Allocation Territory Level | ☐ |
| 2nd Dimension | Planning Measure | ☑ |
| 3rd Dimension | | ☐ |
| 4th Dimension | | ☐ |
| 5th Dimension | | |
| Time Selection | Time Dimension Level for Quotas ˅ | ☑ |

FIG. 7.2

Step 2: Lowest Territory Allocation Level

Select the lowest level of the territory hierarchy for allocating targets

Are targets allocated from the top level through the bottom, leaf node (territory)?

| Select a Level | Level Name |
|---|---|
| Allocation Territory Level | Level 5 | Territory T5 |

*FIG. 7.3*

| Select a Level | Level Name |
|---|---|
| Time Dimension Level for Quotas | Level 3 | Month |

*FIG. 7.4*

| 3rd Dimension | 4th Dimension |
|---|---|
| Product P2 | ⌄ |
| Target Imports | |

*FIG. 7.5*

|  | (Current_Variable) |
|---|---|
| CODE: RLIA3 | RLI00003 |
| Status | ☑ |
| Validation Status |  |
| Ignore Warning | ☐ |
| Display Order |  |
| Configuration | Allocation Methods |
| Secondary Configuration | Data Source for Actual Sales (Plg Measure) |
| Third Configuration | Allocation Territory Level |
| Fourth Configuration |  |
| Fixed Name? | ☐ |
| Name | (Current_Variable) |
| Formula Template Entry | (Auto_Sum) |
| Configuration Hierarchy |  |
| Format Inherited? | ☐ |
| Format | Number |
| List Format (Ref List) |  |
| List Format (Variable) |  |
| Style |  |
| Breakback? | ☐ |
| Formula Concatenation | ☐ |
| Summary Type | Sum |
| Summary Type - Time | Same as Main Summary |
| Empty Configuration Exception |  |
| Empty Configuration Excepti... |  |

*FIG. 8.1*

| | Apply | Sourced From | Name | Is By Planning Measure | Attribute |
|---|---|---|---|---|---|
| Prior Year Amount | ☑ | Data by Order Details | Prior Year Amount | ☑ | |
| Potential Spend | ☑ | Potential Value by Account... | Potential Spend | ☐ | Final Potential S... |
| Addressable Market | ☑ | Addressable Market by Acc... | Addressable Market | ☐ | Addressable Mar... |
| Prior Half Year Amo... | ☐ | Data by Order Details | Prior Half Year Amount | ☑ | |
| Allocation Methods | ☑ | | | | |

*FIG. 8.2*

| | Status | Code: RLIA3 | Validation Status | Generation Notes | Choosing Format Type |
|---|---|---|---|---|---|
| Prior Year Amount | ☑ | RLI00003 | | | Number |
| Potential Spend | ☑ | RLI00003 | | | Number |
| Addressable Market | ☑ | RLI00003 | | | Number |
| Total Allocation | ☑ | RLI62348 | | | Number |
| Allocation Ratio | ☑ | RLI00012 | | | Number |
| Allocation Override % (Region T3) | ☑ | RLI00037 | | | Number |
| Allocated Target | ☑ | RLI00035 | | | Number |
| Allocated Quota (Override Applied) | ☑ | RLI00036 | | | Number |
| Final Target | ☑ | RLI00019 | | | Number |
| Percent of Total (Total Territory) | ☑ | RLI58579 | | | Number |
| Percent of Total (Geo T1) | ☑ | RLI58579 | | | Number |
| Percent of Total (Area T2) | ☑ | RLI00003 | | | Number |
| Percent of Total (Region T3) | ☑ | RLI58580 | | | Number |
| Growth to Prior Year Amount | ☑ | RLI58580 | | | Number |
| Growth to Potential Spend | ☑ | | | | |

Target Allocation by Territory T5, Product P2

820

GENERATED Formula

IF "Attributes by Territory T5':'Non SA'? THEN 'Data LIS by Order Details':Collect[SUM : 'Data by Order Details'.'ITEM:Month (-12)',SUM : 'Data by Order Details','ITEM: Territory T5',SUM : 'Mapping by LIS Planning Measure Actuals':'ITEM: Planning Measure',SUM : 'Data by Order Details','ITEM: Product ID'] ELSE 0

APPLICATION CONFIGURATOR USING A BASELINE MODEL

BACKGROUND

Companies collect large amounts of data about their own operations. This data is then analyzed to determine, among other things, how to improve the operation of the company and/or how to plan for the future operation of the company. Large amounts of data may be analyzed in multiple dimensions. Computing devices operated by users may provide a user interface that displays multiple grids, each showing at least one dimension of the data. Because of the size of the data, the number of dimensions, and the complexity of the dependencies between the multiple dimensions, it may be difficult to manually re-configure the organization of this data.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of a tenant in accordance with one or more embodiments of the invention.

FIG. 1.3 shows a diagram of a baseline model in accordance with one or more embodiments of the invention.

FIG. 1.4 shows a diagram of a generated application in accordance with one or more embodiments of the invention.

FIG. 2.1 shows a flowchart of a method of generating and storing a new configured model in accordance with one or more embodiments of the invention.

FIG. 2.2 shows a flowchart of a method of performing a guided setup for the new configured model in accordance with one or more embodiments of the invention.

FIGS. 3.1-3.3 show an example in accordance with one or more embodiments of the invention.

FIGS. 4-8.3 shows a second example in accordance with one or more embodiments of the invention.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments disclosed herein relate to systems and methods for managing data displayed to a user. The data may be one or more models for use by any number of applications that include the organization of dimensions, modules, line items, formulas, actions, and/or other objects provided to one or more users via a user interface. These applications may include a large number of artifacts, many of which may be interdependent. The presentation of these artifacts may be an important aspect to the user. As such, it may be beneficial to offer modifications to an existing organization of the objects. However, given the size and complexity of this organization, any desired modifications to a model may require extensive re-implementation, which may require extensive time and resources and a high level of knowledge of the organization of every object that would need to be modified.

Embodiments disclosed herein include using an application configurator to provide the configuration of such applications. Embodiments disclosed herein may provide pre-programmed guided setups that enable a user to modify an existing application (also referred to as a baseline model) to a more desired configuration. Each application configurator may be tailored to the baseline model. For example, a given baseline model may be associated with a pre-determined guided setup.

The use of the application configurator may provide an intermediate layer of configuration between a customer using the application and the backend operation to provide a tailored experience. The configuration of a baseline model to generate a configured model using the application configurator may be performed in significantly less time than the time it takes if the implementation was performed manually and without the intermediate layer. For example, based on the amount of data, the number of objects, and the complexity of the baseline model, the re-implementation performed on the baseline model could take several months to complete without the use of an application configurator. In contrast, the same configuration performed on the baseline model using the application configurator may be completed within a few weeks. Additionally, the re-implementation of a baseline model may be performed without requiring an advanced knowledge of the baseline model. In current implementations, an experienced application administrator (e.g., a person or people involved in building the baseline model) would be required to perform the re-implementation. The application configurator described throughout may provide the intermediate layer that includes asking simple questions to a user that may be used for an automatic re-implementation.

Various embodiments of the invention are described herein.

FIG. 1.1 shows a diagram of a system in accordance with one or more embodiments of the invention. The system includes a data system (110) interacting with one or more client devices (100) via a network (120). The components illustrated in FIG. 1.1 may be connected via any number of operable connections supported by any combination of wired and/or wireless networks (e.g., 120). Each component of the system of FIG. 1.1 (including the individual components in the data system) may be operably connected via any combination of wired and/or wireless connections. Each component of the system of FIG. 1.1 is discussed below.

In one or more embodiments of the invention, the data system (110) includes one or more baseline models (112) and any number of tenants (122, 124). The data system (110) may include functionality for storing data. The data may be large amounts of data. At least a portion of the data in the data system (110) (including any one or more of the baseline models (112)) may be provided to the clients (100) via a tenant (122, 124). For example, a tenant (e.g., 122) may be a provisioning of resources of the data system (110) to be used by the client devices (100). The provisioning of the resources may include specifying a customer (e.g., any entity that includes one or more users) and providing access to the provisioned resources to the users of the specified customer. The provision of resources may include any combination of processing, memory, storage, and/or other resources without departing from the invention. In one or more embodiments, a copy of one or more of the baseline models (112) may be stored by a tenant (122) for the purposes of accessing the baseline model, or any generated applications (discussed in FIGS. 1.2-1.4), by the client devices (100) of the corresponding customer, via the tenant (122).

In one embodiment of the invention, the storage of the data system (110) includes any form of non-volatile storage media that may store data (e.g., user data and derived data). Examples of persistent storage may include, but are not limited to, magnetic storage, optical storage, solid state memory, or any combination thereof. In one embodiment of the invention, the data stored in persistent storage may be user data and derived data. Depending on the implementation of the invention, the persistent storage may store the user data and not store the derived data.

In one embodiments of the invention, data is denoted as user data when the data is input by the user, obtained from a user, and/or obtained from a data source specified by the user. Further, in one embodiment of the invention, the data is denoted as derived data if the data is generated (e.g., by applying a function or an algorithm) to user data, other derived data, or any combination thereof.

In one or more embodiments, a tenant (122, 124) includes functionality for receiving requests from the client devices (100) to manage the user data. The requests may be used to obtain user data or derived data from the baseline models (112) (or a copy thereof). Alternatively, the requests may be used to store new user data in the tenant (122) from the client devices (100).

In one embodiment of the invention, the tenant (122, 124) may be implemented on a computing device or as a logical device (e.g., a virtual machine, a container, etc.).

In one or more embodiments of the invention, one or more of the tenants (122, 124) is implemented as a computing device. The computing devices may be, for example, mobile phones, tablet computers, laptop computers, desktop computers, servers, distributed computing systems, or cloud resources. Each computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functionality of the tenant (122, 124) as described throughout this application.

In one or more embodiments of the invention, one or more of the tenants (122, 124) is implemented as a logical device. Each of the logical devices may utilize the computing resources of any number of computing devices and thereby provide the functionality as described throughout this application. Examples of logical devices may include, but are not limited to, virtual machines and containers. For additional details regarding a tenant (122, 124), see, e.g., FIG. 1.2.

In one or more embodiments, the client devices (100) issue requests for storing data and obtaining data from the data system (110). The requests may be processed by the corresponding tenant (122, 124) of the data system (110). The data obtained from the data system (110) may be stored in persistent or non-persistent storage (not shown) of the client devices (102, 104).

Further, the data may be processed by users (not shown) of the client devices (102, 104). For example, a browser of a client device (102) may provide a user interface that enables the user to interact with the data in the client devices (102). The data may be displayed using interfaces of the corresponding model (e.g., the generated application or a baseline model). Each model may organize the data using one or more artifacts (e.g., tables, dimensions, formulas, other modules, etc.) such that the user may view, add, or otherwise modify the data. For additional details regarding a model, see, e.g., FIGS. 1.2-1.4.

In one or more embodiments of the invention, zero, one or more client devices (102, 104) are implemented as computing devices. The computing devices may be, for example, mobile phones, tablet computers, laptop computers, desktop computers, servers, distributed computing systems, or cloud resources. Each computing device may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to issue one or more query requests and to receive one or more query responses as described throughout this application.

In one or more embodiments of the invention, the zero, one, or more client devices (102, 104) are implemented as logical devices. Each of the logical devices may utilize the computing resources of any number of computing devices, and thereby provide the functionality to issue one or more query requests and to receive one or more query responses as described throughout this application. Examples of logical devices may include, but are not limited to, virtual machines and containers.

FIG. 1.2 shows a diagram of a tenant in accordance with one or more embodiments of the invention. The tenant (130) illustrated in FIG. 1.2 may be an embodiment of a tenant (122, 124) discussed above. As discussed above, the tenant (130) may be a provisioned portion of the data system that is provided to a customer. In one embodiment of the invention, the tenant (130) includes an application configurator (132) and one or more workspaces (140, 142). The tenant (130) may include additional, fewer, and/or different components without departing from the invention. Each of these components is described below.

In one or more embodiments, the application configurator (132) includes functionality for configuring a baseline model (discussed above) to generate one or more generated application (144). The application configurator (132) may provide an interface to obtain user selections for the configurations, and output, based on the user selections, the generated application (144).

To perform the aforementioned functionality, the application configurator (132) includes a guided setup interface (134) a set of reference objects (136), and a system compilator (138). The application configurator (132) may include additional, fewer, and/or different components without departing from the invention.

In one or more embodiments of the invention, the application configurator (132) provides a guided setup interface (134) that communicates with a client device (or other entities) to obtain a set of configuration selections (also referred to herein as "guided setup answers") from a user for generating the generated application (144). The guided setup interface (134) may provide the guided setup to the user in accordance with, for example, FIG. 2.2. The result of the guided setup may include the set of configuration selections.

In one or more embodiments of the invention, the guided setup interface (134) is implemented in hardware (i.e., circuitry), software, or any combination thereof. In one or more embodiments, the guided setup interface (134) may be configured to cause a computing system to perform the functionality of the guided setup interface (134) described throughout this application.

In one or more embodiments, the application configurator (132) uses a system compilator (138) to implement the set of configuration selections obtained from the user and to generate the generated application (144). The system compilator (138) may compile the set of user selections to generate a set of calculated objects to be utilized to generate user-generated objects of the generated application (144) using the reference objects (136). The compilation of the artifacts of the generated application (144) may be performed in accordance with FIGS. 2.1-2.2.

In one or more embodiments, the reference objects (136) used by the system compilator (138) include one or more reference lists and/or one or more reference modules and/or one or more reference actions. The reference modules may include one or more reference line items. These reference objects (136) may be manually generated by an application builder user through a user interface of the Application Configurator provided to the application builder user. This user interface may be a separate component of the guided setup interface (134). The reference objects (136) may refer to the set of configuration selections exposed to the user via the guided setup interface (134). The system compilator (138) may include functionality for consolidating these reference objects (136) to be used for the generation of the user-defined objects with the configuration data captured from the end-users, via the guided setup user interface (134). The user-defined objects may collectively comprise the generated application. Additional details regarding the generation and use of these reference objects may be found, for example, in FIGS. 2.2 and 3.1-3.3.

In one or more embodiments, the system compilator (138) further includes functionality for performing additional configuration services such as calculating a model outline using the integration of the reference objects, performing error handling and validation of the integration, and implementing dynamic updates as the user inputs changes to previously-set configuration selections. Specifically, the integration of the reference objects includes organizing the structure of the reference objects to compile the relationships and/or dependencies between the reference objects. The error handling and validation includes any combination of: (i) analyzing the consistency between the relationships or dependencies, (ii) resolving any conflicts or discrepancies between the analyzed relationships or dependencies, and (iii) notifying the user of such discrepancies. The implementation of dynamic updates includes updating the reference objects based on the changes made at the set of configuration selections obtained from the guided setup interface (134) prior to a final compilation of the generated application.

In one or more embodiments, the set of reference objects (136) includes reference modules. The reference modules may be configured based on, at least, a portion of the guided setup answers. The reference modules may be used to generate user-defined modules to be included in the generated application. An example of the configuring of a reference module and the generation of a user-defined module may be found in the description of FIGS. 6.1-6.3.

In one or more embodiments, the reference line items are used to configure user-defined line items. Examples of configurabilities provided by the reference line items include, but are not limited to: a replication of user-defined line items, a simple substitution obtained from a reference line item, a formula substitution of a reference line item, auto-sums/lookups of multiple attributes of one or more reference line items, concatenations of text strings for one or more reference line items, formatting of reference line items, and read/write of line items. Other configurabilities may be provided by the reference line items without departing from the invention. The reference line items may be implemented using dynamic formulas. The dynamic formulas may be an automated execution generated based on the inputs to the guided setup answers and the configurations of the other reference line items used to configure each given user-defined line item. An example of the configuring of a set of user-defined line items may be found in the description of FIGS. 7.1-7.3.

In one or more embodiments, the reference objects (136) include reference actions. In one or more embodiments, the reference actions include mappings that define how target dimensions are set from a source object (e.g., a reference module or a module of the baseline model) and how data for a user-defined line item in a target module is populated by mapping to a line item in the source module. The system compilator (138) may include functionality for referencing the reference actions, providing such mappings to source reference objects such as, e.g., reference lists, reference line items, to target reference objects. The system compilator (138) may support the functionality of replicating actions, such that one action may be created for each hierarchy level. The application configurator may further enable dynamic mappings of reference line items and reference lists.

In one or more embodiments of the invention, the application configurator (132) is implemented in hardware (i.e., circuitry), software, or any combination thereof. In one or more embodiments, the application configurator (132) may be configured to cause a computing system to perform the functionality of the application configurator (132) described throughout this application.

In one or more embodiments, the tenant (130) may utilize any number of workspaces (140, 142). A workspace may be a provisioning of resources for the execution of an application by at least a subset of users associated with the tenant (130). For example, a workspace (140, 142) may be used for executing an instance of a baseline model (discussed in FIG. 1.1). Further, a workspace (140, 142) may be used for the purposes of executing one or more generated application (144) generated using the application configurator (132). The generated application (144) may be generated in accordance with methods described throughout this disclosure and/or at least a portion, of the methods described in, for example, FIGS. 2.1-22. Additional details regarding a generated application are described in FIG. 1.4.

While the application configurator (132) is illustrated in FIG. 1.2 as being a separate component from any of the workspaces (140, 142), an instance of the application configurator (132) may operate in any of the workspaces (140, 142) of the tenant (130).

FIG. 1.3 shows a diagram of a baseline model. The baseline model (150) may be an embodiment of a baseline model (114, 116, FIG. 1.1) described above. The baseline model may be used for the generation of generated application. The baseline model (150) is a pre-existing model, implementing a specific use case (Such as Territory and Quota, for a factitious customer) and may include artifacts such as, for example, lists (152), modules (154), line items (156), dynamic formulas (158), and application actions (160). The baseline model (150) may include additional, fewer, and/or different artifacts without departing from the invention. For example, the baseline model (150) further includes a corresponding user interface that exposes these objects to end-users via data grids, charts, and/or other user interface widgets. The baseline model (150) is used as a reference for the application builder user, to create all the related reference objects (136) of the Application Configurator (132).

The lists (152) may each include a list of objects (e.g., list items) organized based on a predetermined organization of the baseline model. The modules (154) may be data structures that further organize line items (156), or other objects, in a table or other diagrams (e.g., pie charts, time series, bar graphs, etc.). The formulas (158) may be computable functions that input one or more line items (156), or other objects, to output values, other functions, or other objects. The outputs of a dynamic formula (158) may alter as the values of the input objects are changed. The application actions (160) may be executable actions that are performed by a client device (or other entity such as an application programming interface (API)). Examples of application actions (160) include, but are not limited to, importing data from one object to a second object, exporting the information included in one object (or reference object) to a user-defined object, and mapping a user-defined object to a reference object. The list (152), modules (154), line items (156), formulas (158) and Actions (160) are part of the existing artifacts of the baseline model (150).

As discussed above, the application configurator (132, FIG. 1.2) includes functionality for generating one or more generated applications based on a set of configuration selections of a user. Turning to FIG. 1.4, FIG. 1.4 shows a diagram of the generated application (162) generated using the application configurator (132). The generated application (162) may include a data hub (164), a corresponding data hub user interface (168), a spoke model (166), and corresponding spoke model user interface (170). The generated application (162) may include additional, fewer, and/or different components without departing from the invention.

In one or more embodiments, the data hub (164) is a source of data that may be accessible to any number of spoke models (e.g., 166). The data hub (164) may include a collection of user-defined objects such as lists, modules, line items that may be used for the operation of a use case corresponding to the generated application (162). The data hub (164) may be generated by the application configurator using the reference objects of the baseline model discussed throughout this disclosure. The generated application (162) further comprises a corresponding data hub user interface (168) that enables a client device access to the data hub (164).

In one or more embodiments of the invention, the spoke model (166) is an additional application that includes functionality for storing additional information associated with the user-defined objects of the data hub (164). While the generated application (162) is illustrated in FIG. 1.4 as including one spoke model (166), the generated application (162) may include any number of spoke models without departing from the invention. Each spoke models (e.g., 166) may include a corresponding spoke model user interface (170) that provides the users using the generated application (162) the access to such data.

Each of the spoke model user interfaces (170) and the data hub user interface (168) may be, for example, graphical user interfaces (GUIs).

While the system of FIGS. 1.1-1.4 has been illustrated as including a limited number of components for the sake of brevity, the system may include additional components (not shown), fewer components, and/or different components (not shown) without departing from the invention.

FIGS. 2.1-2.2 show flowcharts in accordance with one or more embodiments of the invention. While the various steps in the flowcharts are presented and described sequentially, one of ordinary skill in the relevant art will appreciate that some or all of the steps may be executed in different orders, may be combined or omitted, and some or all steps may be executed in parallel. In one embodiment of the invention, the steps shown in FIGS. 3.1-3.5 may be performed in parallel with any other steps shown in FIGS. 2.1-2.2 without departing from the scope of the invention.

FIG. 2.1 shows a flowchart of a method of generating and storing a new configured model in accordance with one or more embodiments of the invention. All or a portion of the method shown in FIG. 2.1 may be performed by, for example, the application configurator (132, FIG. 1.2). Other components of the system of FIGS. 1.1-1.4 may perform the method of FIG. 2.1 without departing from the invention.

Turning to FIG. 2.1, in step 200, an application configurator is built associated with a use case. In one or more embodiments, the application configurator is built by generating a set of configurations to be selected from by a user (or other entity). The building of the application configurator may be based on the use case of the baseline model. For example, a baseline model may be associated with a territory and quota use case. The territory and quota use case may include a subset of users including representatives (e.g., sales managers and sales operations managers) planning the sales force organization and setting targets for the next quarters, by creating sales territories, assigning sales representatives and accounts (i.e., customers) to the sales territories, then by setting targets on territories that, through an allocation process, will determine the quotas that will be calculated and communicated to each of the sales representatives. The application configurator may be generated using the territory and quota use case as a basis. In this manner, the configuration options included in the application configurator provide mechanisms for a system administrator of the sales force organization to modify the baseline model and corresponding user interface as preferred by the sales force organization.

In step 202, at a point in time after the application configurator has been built, a request for a new configured model corresponding to the use case is obtained. The request may specify requesting to initiate the application configurator built in step 200. The request may specify the baseline model (associating the request to the application configurator).

In step 204, a guided setup is initiated using a guided setup interface of the application configurator and using the corresponding baseline model. In one or more embodiments, the application configurator provides the guided setup interface to the client device (or other entity requesting a configured model). The client device may utilize the guided setup interface of the application configurator to obtain a set of configuration selections to be used for the generation of the new configured model.

Following the initiation of the guided setup, the method may proceed to the method of FIG. 2.2. The result of performing the method of FIG. 2.2 may include a set of new configured models generated in response to completing the guided setup.

In step 206, after the guided setup is completed, the generated application (including the user-defined objects and the corresponding user interfaces) is provided to the data system to be accessed by the client device of the data system. The generated application may include a data hub, a spoke model and the corresponding user interfaces (discussed above).

FIG. 2.2 shows a flowchart of a method of performing a guided setup for the new configured model in accordance with one or more embodiments of the invention. All or a portion of the method shown in FIG. 2.2 may be performed by, for example, a grid state manager (142, 144, FIG. 1.2). Other components of the system of FIGS. 1.1-2 may perform the method of FIG. 3.2 without departing from the invention.

In step 220, an initial data attribute fact setup is configured using an initial set of artifacts of a baseline model. In one or more embodiments, the initial data attribute fact setup includes a set of objects to be included in the generation of objects for the generated application. For example, a user may select from a list of existing objects of the baseline model to include in the set of user-defined objects. The user may input a naming convention to rename each, if any, of the objects, and may input a type of the artifact (e.g., a data type, a hierarchy type, a list). For each list included in the configured set of artifacts, an additional level of configuration may be provided to further modify the objects (e.g., line item attributes) in the list.

In step 222, a hierarchical structure of data elements associated with the configured set of data sources are configured to obtain a configured hierarchical structure of data elements. In one or more embodiments, the guided setup interface provides a set of configurations for modifying the existing hierarchical structure of the baseline model. Specifically, the guided setup interface may provide the option to select a set of hierarchy levels in the configured hierarchical structure, and which data elements (list attributes) are assigned to each of the hierarchy level. The selected hierarchies may be a portion of the hierarchies in the baseline model and/or other hierarchies relative to the hierarchies of the baseline models.

In step 224, subprocesses of each of the configurable applications are configured based on the configured hierarchical structure and the initial data attribute fact setup. In one or more embodiments, each subprocess is a portion of the configuration options that is separated based on a portion of the baseline model that is to be modified. For example, in the territory and quota use case, example subprocesses include a subprocess for scenario planning, a second subprocess for target setting, and a third subprocess for resource alignment. Each of these subprocesses may include any forms of selection options such as, for example, drop down menus, grids for capturing multiple-cell text or numbers, buttons to add or delete selected metrics, check boxes to select (or deselect) desired artifacts, etc.

In step 226, a set of objects are calculated based on the configured subprocesses for the new generated application and based on the reference objects provided in the configurator application. These objects are calculated by the system compilator (138, FIG. 1.2). In one or more embodiments, the reference objects include a set of reference modules, a set of reference line items, and a set of reference actions. The reference modules are a set of configurable modules associated with the set of configuration selections. The reference modules may each include any number of reference line items. The reference modules may be automatically configured based on the set of configuration selections. Further, the application configurator may provide a configuration interface, accessible to a configurator builder, for creation and modification of all reference objects. This interface may not be provided to the users requesting the generated application. The configuration builder may be associated with a user that is different from the user requesting to obtain the generated application.

In step 228, application programming interface (API) calls are initiated, through a user interface provided by the Anaplan platform, to generate a set of user-defined objects using the objects calculated by the configurator in step 226 above. In one or more embodiments, the API calls may be instructions implemented by the configurator to generate Anaplan artifacts (lists, modules etc. . . . ) from the objects calculated by the system compilator, using reference objects and the configuration answers. Specifically, the API calls may include accessing the identified initial set of artifacts calculated by the system compiler, generating new artifacts based on the configured hierarchical structure, and organizing the new artifacts based on the configured data attribute fact setup. These API calls generate the user-defined objects (e.g., the lists, modules, hierarchies, modules, line items, formulas, actions, and corresponding user interfaces). The result of generating the user-defined objects is the generated application. The generated application includes the user-defined objects and the organization of these user-defined objects.

To further clarify the actions performed by various components in the system, a non-limiting example is described below.

Example 1

The following describes an example. FIGS. 3.1-3.3 are used to describe this example. Actions performed in this example may be illustrated in FIGS. 3.1-3.3 using circled numbers. The illustrated actions are described below using bracketed numbers (e.g., "[1]").

Turning to the example, consider a scenario in which a data system provides an existing application that a user would like to modify to meet a specific use case of the customer. FIG. 3.1 shows a diagram of a data system. The example data system (310) includes a territory and quota (T&Q) baseline model (312) and a tenant (330). The tenant (330) is a provision of the data system (310) reserved for use by the customer.

In this example, the customer is a company that includes a sales force organization tracking their key performance metrics (KPIs) and would like to modify a few portions of the T&Q baseline model (312) to meet a requested layout of the application. To provide the ability to perform the desired modifications, an application configurator (332) is installed in the tenant (330). The application configurator (332) is linked to the T&Q baseline model (312) as the application configurator (332) was built with the functionality of enabling modifications to the T&Q baseline model (312) [1]. This application configurator (332) includes a guided setup interface (334), a set of reference objects (338) and a system compiler (336).

Turning to FIG. 3.2, at a point in time after the application configurator is installed in the tenant (330), a client device A (304), operated by a user of the company, requests to implement a configuration of the T&Q baseline model (312). Client device A (304) sends a request for the configuration to the application configurator (332) by opening the application configurator (332) [2]. The application configurator (332), in response to the opening, initiates the guided setup interface (334) to provide a set of configuration options to the client device. The client device (304) performs the method of FIG. 2.2 to select the preferred set of configuration selections. The set of configuration selections are used to generate the new configured models.

Figure 5:
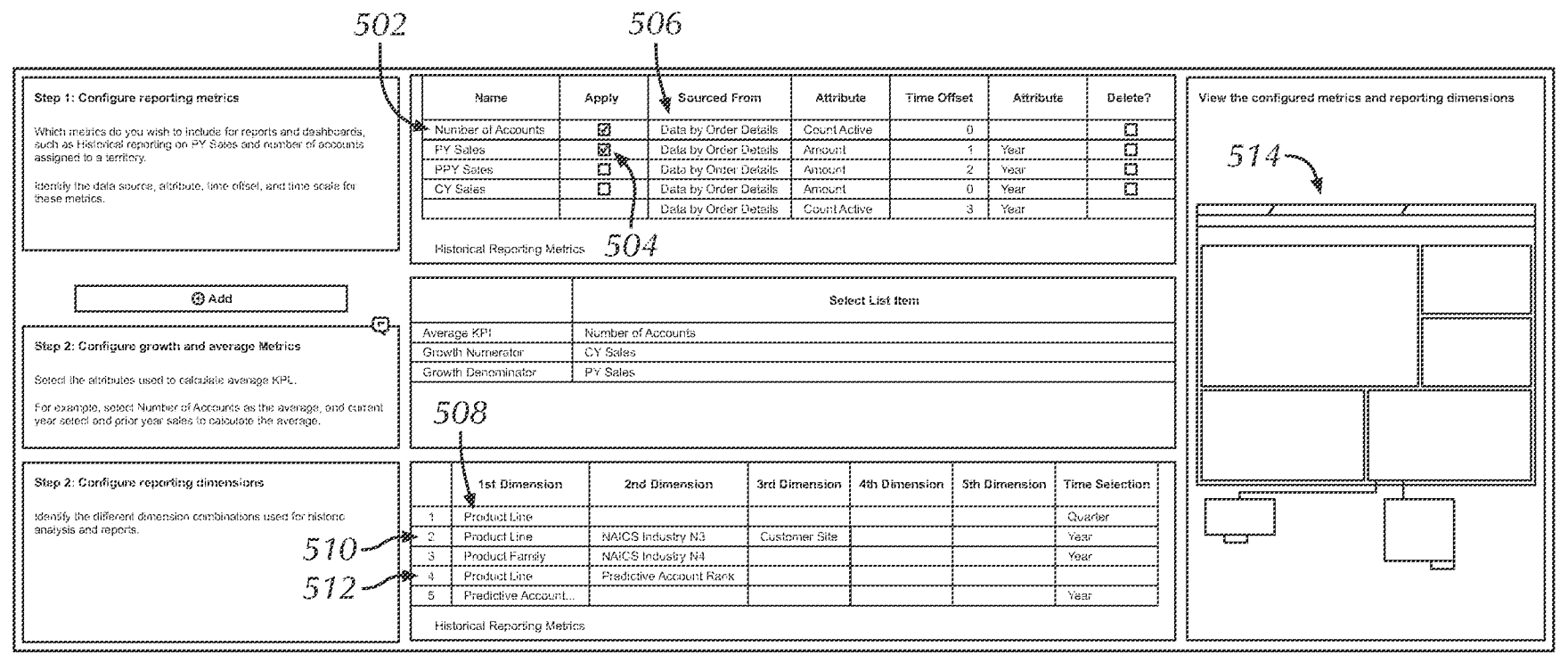

Turning to FIG. 3.3, the system compiler (336) obtains the set of configuration selections from the guided setup interface (334) and uses the guided setup answers, combined with a set of reference objects (338) such as reference modules, reference line items, and reference actions [4] to calculate the objects that will in turn be generated as regular Anaplan artifact within the generated models (Data Hub (342) and Spoke Model (344), as well as generating the corresponding interfaces (346 and 348)). Example descriptions of the configurations and the reference objects (338) may be found in FIGS. 4-8.3. These reference objects (338) are used with the configurations to generate a data hub (342) and a spoke model (336) and the corresponding interfaces such as the data hub interface (346) and the spoke model interface (348) [5]. The data hub (334) is a data source that is a re-organization of the data in the T&Q baseline model (312) in accordance with the user-defined objects generated from the reference objects (338). The data hub interface (346) includes the user interface for accessing the user-generated objects of the data hub (342) by the client device (304). Similarly, the spoke model interface (348) is a user interface that accesses the data in the spoke model (344) in accordance with the requested configurations specified in the set of configuration selections. For example, the spoke model (344) may include one or more graphs generated from the user-generated objects of the data hub (342) and provides all the functionality specific to the T&Q use case. The spoke model interface (348) provides a screen for displaying these graphs to the client device (304). The client device (304) accesses the data hub interface (346) and the spoke model interface (348) and thus accesses the new generated application that is a re-implementation of the T&Q baseline model (312) [6].

End of Example 1

To further clarify embodiments disclosed herein, the following section provides non-limiting examples about at least a portion of the features provided by the guided setup interface and the system compilator.

Example 2

In the following section, various examples of features offered by the application configurator are provided to further clarify at least a portion of the set of configuration selections offered by both the guided setup interface and the system compilator of the application configurator. While not all features offered by the application configuration are discussed in the following section, the application for FIGS. 4-8.3 show diagrams of example screens of the guided setup interface, the configuration screens of the system compilator, and their use case in the territory and quota (T&Q) baseline model.

FIG. 4 shows an example diagram of configuration of the main structure (such as lists and a hierarchical structure) of the data hub and spoke model. The selections made in FIG. 4 provide the initial data attribute fact setup. As shown in FIG. 4, a user may select from a set of available objects (402). The user may select, or unselect any of the set of available objects (402) using check boxes (404). In this screen, a completion display (406) is provided that calculates a percentage of the required configuration selections made. In this example, the user has completed 80% of the configuration selections. The configuration provided in the screen of FIG. 4 allows the user to select/unselect/rename the set of available objects that will be used in the T&Q spoke model. Additionally, the guided setup interface may provide additional configurations to select/unselect/rename every attribute of each of the illustrated set of available objects (402). This additional configuration is not illustrated in any of FIGS. 4-8.3. The configuration displayed in FIG. 4 (or any additional configurations) may be returned to at a later time as the user completes the remainder of the subprocesses.

FIG. 5 shows a diagram of an example guided setup interface screen for the T&Q application configurator. The guided setup interface screen includes the capturing of details relating to the configuration of historical reporting metrics to be calculated and produced in the new configured model. In FIG. 5, a selection of attributes (502) are provided to the included in the historical metrics calculations. A check box selection (506) is included to select whether a given attribute is to be included in the calculation. A selection of the "Sourced from" option (506) provides the option to select a reference artifact such as a list of the T&Q baseline model to be accessed when identifying the corresponding attributes. In this example, all of the selection of attributes (502) are sourced from the "Data by Order Details" list.

The second subprocess further provides the option to configure any number of historical reporting metrics on a multi-dimensional level. A first historical performance metric (508) may provide the measurement of a product line on a per-quarter basis. A second historical performance metric (510) may provide the measurement of the product line, a NAICS Industry N3, and the customer size on a per-year basis. A third historical performance metric (512) may provide the measurement of the product line and a predictive account rank on a per-year basis. The screen of the second subprocess may further provide an example preview (514) of the historical metrics as they would appear in the new configured model.

FIG. 6.1 shows a diagram of a configuration interface for generating one or more reference objects. The configuration interface of FIG. 6.1 illustrates a set of configurable elements in the territory level of the hierarchical structure. A first reference object (602) titled "Territory Target Import Level" is configured to specify a reference functional area from the existing T&Q model. The reference object (602) includes a set of configuration selections (604, 606, 608) input based on selections made during the guided setup interface by the user.

FIG. 6.2 shows a second diagram of a configuration interface for generating additional reference objects. A second reference object (610) titled "Target Imports" includes a second set of configuration selections (612) input based on the selections made (e.g., 614) during the guided setup interface.

FIG. 6.3 shows a diagram of a configuration screen for a first subprocess of the guided setup interface. The first subprocess corresponds to a target and allocation subprocess. The configuration screen of FIG. 6.3 provides a first option (620) for selecting a hierarchy level for the territory hierarchy for the "Territory Target Import Level" reference object discussed in FIG. 6.1. This first option (620) is provided as a top-down menu. Further, the configuration screen further provides a second option (622) for selecting additional dimensions used for target setting for the "Target Imports" reference object. This second option (622) is provided as a selection mechanism for selecting from existing objects in the T&Q model. In this example, the application configurator for the T&Q model may include about 215 configurations, categorized into 10 different types.

The configurations offered by the system compiler includes the generation of reference objects such as reference modules. The reference modules includes any number of reference line items and may be associated with specific dimensions (also referred to as lists). In this example, the T&Q baseline model may include 300 modules and 3000 line items. The application configurator associated with the T&Q baseline model provides the ability to generate reference modules from the existing modules of the T&Q baseline model.

FIGS. 7.1-7.5 show an example scenario in which a reference module is set up.

Turning to FIG. 7.1, FIG. 7.1 shows a diagram of a configuration for one or more reference modules. The "Target Import by Territory, Year, and other" reference module (702) may be configured. This reference module (702) may facilitate the inclusion of up to two additional dimensions. The variable dimensionality of this reference module is established using a configuration screen visualized in FIG. 7.2.

FIGS. 7.3-7.5 show example guided setup interface screens used for configuring portions of the "Target Import by Territory, Year, and other" reference module. The guided setup interface screen shown in FIG. 7.3 provides configuration of the allocation territory level. The guided setup interface screen shown in FIG. 7.4 provides configuration of the time dimension level for quotas. The guided setup interface screen shown in FIG. 7.5 provides configuration of the additional two dimensions for the "Target Imports" reference object.

After obtaining the configuration selections specified in FIGS. 7.3-7.5 and using a "Target Allocation by Territory, Time, and other" reference module, a user-defined module of "Target Allocation by Territory T5, Product P2" is generated that uses the dimensions "Territory T5, Planning Measure, Product P2, and Month". A set of API calls are initiated to generate the user-defined module for the generated application.

FIGS. 8.1-8.3 show an example scenario in which user-defined line items are configured. FIG. 8.1 shows a diagram of a configuration of a line item. The line item may be titled "RLI00003". The reference line item of FIG. 8.1 may be configured using the Allocation Methods configuration. The reference formula for this reference line item is {Auto-Sum}.

FIG. 8.2 shows a diagram of a guided setup interface screen for configuring the "Allocation Methods" configuration. As illustrated in FIG. 8.2, the "Prior Year Amount", "Potential Spend", and "Addressable Market" dimensions are selected for the "Allocation Methods" configuration. Based on this configuration, three user-defined line items are generated. FIG. 8.3 shows a diagram of example user-defined line items generated for the generated application. Based on the configuration of reference line item "RLI00003" illustrated in FIG. 8.1, three user-defined line items (820) are generated.

The three user-defined line items (820) may each be defined using a dynamic formula. The application configurator includes functionality for generating user-defined formulas based on configurations as defined throughout this disclosure. An example generated formula (820) is provided for one of the reference line items in FIG. 8.3. In FIG. 8.3, a generated formula (822) for a line item (820) labeled "Addressable Market" is illustrated.

End of Example 2

One or more embodiments of the invention may be implemented using instructions executed by one or more processors of the data management device. Further, such instructions may correspond to computer readable instructions that are stored on one or more non-transitory computer readable mediums.

Embodiments of the invention may improve data processing technology for very large data sets. Specifically, embodiments of the invention may improve the process for managing data. Specifically, embodiments improve the user experience by providing a mechanism for modifying existing configurations of baseline models that include a large set of complex organization of data, large sizes of modules, and a complex set of dependencies of reference artifacts. For example, an apparently simple change in the dimensionality of an object in a baseline model to adjust to a customer-specific need may require a highly undesirable amount of time and a high level of knowledge (e.g., using reverse engineering) of the baseline model to properly implement due to the high number of dependencies to the pre-configured dimensionality. Embodiments disclosed herein provide methods and systems for performing such re-organization and modifications such that the time taken to generate the new configured models is significantly reduced.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. A system, comprising:
a baseline model;
a client device; and
a workspace comprising an application configurator, wherein the application configurator is programmed to:
obtain, from the client device, a request for a generated application, wherein the generated application is based on the baseline model;
in response to the request, initiate a guided setup using a guided setup interface to obtain a set of configuration selections for generating the generated application;
generate a set of reference objects based on the set of configuration selections;
apply a set of application programming interface (API) calls to the set of reference objects to generate a data hub, wherein the data hub stores data associated with the baseline model and based on the set of configuration selections;
generate a spoke model based on the data hub, wherein the spoke model comprises a user interface to access the data in the data hub;
store the spoke model and the data hub in the workspace; and
provide access to the spoke model and the data hub,
wherein the generated application comprises the spoke model and the data hub.

2. The system of claim 1, wherein the application configurator is generated using the baseline model.

3. The system of claim 1, wherein the baseline model comprises: a set of line items, a set of modules, a set of application actions, and a set of dynamic formulas.

4. The system of claim 3, wherein generating the generated application comprises re-organizing the set of line items to obtain user-defined line items.

5. The system of claim 3, wherein generating the generated application comprises generating a user-defined dynamic formula using the set of dynamic formulas.

6. The system of claim 1, wherein initiating the guided setup comprises:
configuring an initial data attribute fact setup using reference artifacts of the baseline model using the set of configuration selections;
configuring a new hierarchical structure of the generated application based on the set of configuration selections and based on a hierarchical structure of the baseline model; and
configuring a set of subprocesses based on the new hierarchical structure and the initial data attribute fact setup.

7. A method for managing data, comprising:
obtaining, by an application configurator, a request for a generated application, wherein the generated application is based on a baseline model;
in response to the request, initiating a guided setup using a guided setup interface for obtaining a set of configuration selections;
generating a set of reference objects based on the set of configuration selections;
generating a set of user-defined objects using the set of reference objects; and
providing a user interface of the set of user-defined objects to a client sending the request,
wherein the generated application comprises the set of user-defined objects and the user interface.

8. The method of claim 7, further comprising: generating the application configurator using the baseline model.

9. The method of claim 7, wherein the baseline model comprises a set of line items, a set of modules, and a set of dynamic formulas.

10. The method of claim 9, wherein generating the generated application comprises re-organizing the set of line items to obtain customized line items, wherein the set of user-defined objects comprises the customized line items.

11. The method of claim 9, wherein generating the generated application comprises generating a new dynamic formula using one of the set of dynamic formulas to obtain a user-defined formula.

12. The method of claim 7, wherein initiating the guided setup comprises:
configuring an initial data attribute fact setup of the baseline model;
configuring a new hierarchical structure of the generated application using a set of configuration selections and based on a hierarchical structure of the baseline model;
configuring a set of subprocesses based on the new hierarchical structure and the initial data attribute fact setup; and
initiating application programming interface (API) calls to implement the set of subprocesses on the baseline model to obtain the set of user-defined objects.

13. The method of claim 7, wherein the generated application comprises a data hub and a spoke model.

14. The method of claim 13, wherein the data hub comprises the set of user-defined objects.

15. A non-transitory computer readable medium comprising computer readable program code, which when executed by a computer processor enables the computer processor to perform a method for managing data, the method comprising:
obtaining, by an application configurator, a request for a generated application, wherein the generated application is based on a baseline model;
in response to the request, initiating a guided setup using a guided setup interface for obtaining a set of configuration selections;
generating a set of reference objects based on the set of configuration selections;
generating a set of user-defined objects using the set of reference objects; and
providing a user interface of the set of user-defined objects to a client sending the request,
wherein the generated application comprises a data hub and a spoke model, and
wherein the data hub comprises the set of user-defined objects and the user interface.

16. The non-transitory computer readable medium of claim 15, further comprising: generating the application configurator using the baseline model.

17. The non-transitory computer readable medium of claim 15, wherein the baseline model comprises a set of line items, a set of modules, and a set of dynamic formulas.

18. The non-transitory computer readable medium of claim 17, wherein generating the generated application comprises re-organizing the set of line items to obtain customized line items, wherein the set of user-defined objects comprises the customized line items.

19. The non-transitory computer readable medium of claim 17, wherein generating the generated application comprises generating a new dynamic formula using one of the set of dynamic formulas to obtain a user-defined formula.

20. The non-transitory computer readable medium of claim 15, wherein initiating the guided setup comprises:
configuring an initial data attribute fact setup of the baseline model;

configuring a new hierarchical structure of the generated application using a set of configuration selections and based on a hierarchical structure of the baseline model;

configuring a set of subprocesses based on the new hierarchical structure and the initial data attribute fact setup; and initiating application programming interface (API) calls to implement the set of subprocesses on the baseline model to obtain the set of user-defined objects.

* * * * *